(12) United States Patent
Beard

(10) Patent No.: US 8,559,420 B1
(45) Date of Patent: Oct. 15, 2013

(54) METHOD AND APPARATUS FOR REDUCING CONTROL COMMUNICATION DELAY IN A REMOTELY CONTROLLED APPARATUS

(75) Inventor: Paul Beard, Bigfork, MT (US)

(73) Assignee: Unmanned Systems, Inc., Henderson, NV (US)

( * ) Notice: Subject to any disclaimer, the term of this patent is extended or adjusted under 35 U.S.C. 154(b) by 159 days.

(21) Appl. No.: 13/227,114

(22) Filed: Sep. 7, 2011

(51) Int. Cl.
 *H04L 29/06* (2006.01)
(52) U.S. Cl.
 CPC .... *H04L 29/06496* (2013.01); *H04L 29/06353* (2013.01)
 USPC ......................................... 370/352; 379/93.01
(58) Field of Classification Search
 CPC .................... H04L 29/06496; H04L 29/06353
 USPC ......................................... 370/352; 379/93.01
 See application file for complete search history.

(56) References Cited

U.S. PATENT DOCUMENTS

| | | | | |
|---|---|---|---|---|
| 5,615,214 A | * | 3/1997 | Chandos et al. | 370/349 |
| 5,940,444 A | * | 8/1999 | Jenkin et al. | 375/260 |
| 6,219,043 B1 | * | 4/2001 | Yogeshwar et al. | 341/55 |
| 6,556,560 B1 | | 4/2003 | Katseff et al. | |
| 7,940,747 B2 | * | 5/2011 | Kenney et al. | 370/352 |
| 2009/0178096 A1 | | 7/2009 | Menn et al. | |
| 2010/0046907 A1 | | 2/2010 | Ohbitsu | |
| 2010/0188967 A1 | * | 7/2010 | Michaelis et al. | 370/216 |

OTHER PUBLICATIONS

Suzuki, Junji, et al., "Missing Packet Recovery Techniques for Low-Bit-Rate Coded Speech", IEEE Journal on Selected Areas lin Communications, vol. 7, No. 5, Jun. 1989, pp. 707-717, 1989 IEEE.
Yuito, Mitsuhiro, et al., "A New Sample-Interpolation Method for Recovering Missing Speech Samples in Packet Voice Communications", pp. 381-384, 1989 IEEE.

* cited by examiner

*Primary Examiner* — Kibrom T Hailu
*Assistant Examiner* — Benjamin Lamont
(74) *Attorney, Agent, or Firm* — Suiter Swantz pc llo

(57) ABSTRACT

A scatterer gatherer method and device configured to remotely manipulate an apparatus. The scatterer sends a group of identical packets through a network. The route each packet takes through the network is determined by the network. The time taken for a first packet of a group to travel from origin to destination is unequal from that taken by a second packet of the group. A gatherer is configured to receive each packet, determine which is the first of the group of identical packets to arrive, store the first and discard the later arriving packets of the group. The gatherer further configured to interpolate to determine a value for a missing group of packets should none of the group arrives within a predetermined time. The method and device further configured to use the stored data to remotely manipulate an apparatus then provide feedback to the user through a return network path.

14 Claims, 9 Drawing Sheets

METHOD AND APPARATUS FOR REDUCING CONTROL COMMUNICATION DELAY IN A REMOTELY CONTROLLED APPARATUS

TECHNICAL FIELD

The present disclosure generally relates to the field of latency in network transmission of a digital signal. More specifically, embodiments of the present invention relate to transmission and reception of a plurality of identical signal sets corresponding to a control signal and then reassembling the control signal from the first of each of the identical signals to arrive at the destination. Further embodiments of the present invention include interpolation to predict the value of data not received within a time threshold.

BACKGROUND

The challenge of speed in transmission through a network is continuous. Remote operators desire near real time reception of a transmitted signal. Many remotely operated apparatuses may require near immediate network speeds such that time is critical to ensure apparatus success and general safety. Current network latency values may exceed those required for safe and effective operation of time critical manipulation of a remotely operated apparatus As an example, latency values of 50-100 milliseconds (ms) may be considered standard or average as found in many pathways through, for example, an INTERNET connection. A routine speed test run on a desktop PC connected to the INTERNET via an ETHERNET connection may yield in the range of 60-70 ms. These transmission speeds may prove too slow to accommodate a time critical operation of a remotely controlled apparatus. For example, a surgeon remotely operating on a patient or a pilot controlling an aircraft may require input and any feedback at a faster rate (e.g., less than 30 ms).

Current latency reduction systems and apparatus provide insufficient latency reduction for the safe operation of remotely controlled vehicle and surgical apparatus. Remotely controlled mission critical devices require onsite direct control characteristics. Such onsite direct control characteristics are particularly elusive where communication is interposed over a web-based network where any of a number of pathways will have varying transmit and receive times. Different pathways for different packets produces unpredictable transmit and receive times with over-all average latencies in excessive of those necessary for predictable and safe operational results. For example, during a landing flare, latency may cause operator inputs to induce out-of-sync control to aircraft pitch attitudes causing porpoising generally resulting in remote vehicle destruction. Control inputs are often intended to overcome a previous over control (excessive) control input. Such inputs are intended to produce destructive rather than constructive harmonics. Where feedback arrives too long after a control input an operator seeking to finesse/operate/control an aircraft (apparatus) into a desired angle of attack or position (for example) may instead exacerbate the condition/problem. Such instances may very quickly devolve into an unrecoverable condition.

U.S. Pat. No. 6,556,560 to Katseff, et al. attempts latency reduction through "downsampling the data rate to equal an interim data rate." Katseff reduces latency at a conversion stage from analog to digital through increased sampling rate at the transmission end to "fill" the buffer more quickly with higher fidelity data allowing a lower latency value through the buffer. The same is done on the receiving end to reduce time delay through the buffer. Katseff's method however, does not address the latency values found from end to end in a transmission through a network.

U.S. patent application Ser. No. 12/603,224 filed Oct. 22, 2009 by Ohbitsu discloses a device for reproduction of missing signals. This signal transmission and reception device may detect missing signals at a receiving end and interpolate from the received signals to find the missing signals. The method disclosed by Ohbitsu does not increase the address the speed or likelihood a packet of data will reach a destination in a mission critical environment.

U.S. patent application Ser. No. 11/969,219 filed Jan. 3, 2008 by Menn et al. discloses a method of packet loss mitigation using predictive multisending of data based on an analysis of invariant and variable parameters associated with data transmission. Menn discloses however, sending duplicates of every packet may increase processing times and/or overload the network.

Noon "Missing Packet Recovery Techniques for Low-Bit-Rate Coded Speech" by Suzuki and Taka published June 1989 summarizes various techniques including substitution, interpolation, and Linux Standard Bus (LSB) dropping. The authors found LSB-dropping as the preferred method of missing packet recovery as scored by listeners. The disclosure is limited audio post-reception techniques and fails to address full end-to-end latency.

"A New Sample-Interpolation method for Recovering Missing Speech Samples in Packet Voice Communications" by Yuito and Matsuo published 1989 (IEEE) discloses a pattern matching method of interpolation to achieve acceptable results during packet loss. As with Suzuki et al., the disclosure is limited to post-reception activity and fails to address latency issues with a signal from transmission to reception.

Consequently, it would be advantageous if a method and device existed capable of transmission of a group of multiple identical packets through a network, the network determining the path in which each individual packet or signal may travel (thereby adding at least a latency or an average latency). The unequal time of travel of each signal being determined by the path chosen for it by the network. The method and device taking advantage of the unequal time each packet may take through the network. The method and device further able to receive the signals and determine the first to arrive of each group of identical signals, save the data included in the first to arrive and ignore the later arriving of the identical signals. The method and device further configured to interpolate to determine a data value if at least one of the identical signals should not arrive within a variable wait time. The waiting time limited to a time less than a time necessary to prevent overall system controlled latency being more than substantially less than the networks average latency. The method and device further configured to manipulate an apparatus at the receiving end using the reconstructed data. The device finally configured to transmit feedback to the user.

SUMMARY

Accordingly, preferred embodiments of the present disclosure are directed to a method and device for latency (delay) reduction in data transmission through a network to remotely manipulate an apparatus. The method comprising a scatterer on an operator side of a network, which may send a group of identical packets through the network. The network determines the route each packet takes through the network. The time taken for a first packet of a group to travel from transmission to reception is unequal from that taken by a second packet of the group. The method further comprising a gatherer on a remote side of the network, the gatherer configured to: receive each packet, determine which is the first of the group of identical packets to arrive, store the first and discard the later arriving packets. The gatherer further configured to interpolate to determine a value for a missing group of packets should none of the group arrives within a predetermined time. The gatherer further configured to output the stored data to manipulate an apparatus then provide feedback to the user through a different return path through the network. In a preferred embodiment of the present invention, the method may be configured to remotely manipulate, and receive feedback from, an unmanned aircraft.

One embodiment of the present invention teaches a method for reducing control communication delay through a network between a operator and a remote apparatus. In such a method a scatterer and a gatherer are utilized. For duplex communication a scatterer and a gatherer are associated at both the operator and remote apparatus ends of a communication link. The scatterer of the method is configured to receive an analog control input from an operator and then convert the control input into a first digital control signal representing the control input. The method is further configured to clone the first digital signal making at least three copies of the first digital signal. The scatterer configured to packetize the first digital signal and each clone of the first digital signal creating a group of at least three identical packets containing a digital value representative of the first digital signal. The scatterer clones and addresses each packet representing the control signal and transmits over a WEB based network (or multi-node network or the like). These steps are then repeated as each analog control movement is made. At the apparatus end of the communication network a gatherer is utilized in accordance with the one embodiment of the method of the invention.

The gatherer of the method is configured to produce a control movement corresponding to the analog control input from an operator timely reassembled from the scatterer addressed packet clones. As each addressed packet is received from the scatterer's broadcast over a WEB based network, (or multi-node network or the like) the device reorders (reassembles) the signal to represent and correspond to the analog control movement on, for example, a first to arrive basis. In operation, one of each of the clones representing a control packet will arrive before its brethren. These first to arrive members are cached as an assembled unit representing and corresponding to the original operator's analog control input. When no clone of an intermediate or initial clone packet arrives within a set time (set time or time threshold), the device interpolates according to an embodiment of the invention. In this manner the method provides a substantially improved average latency.

An additional embodiment of the present invention teaches a device for reducing control communication delay through a network between an operator and a remotely piloted aircraft. In such a device, a scatterer and a gatherer are utilized. For duplex communication a scatterer and a gatherer are associated at both the operator and remote apparatus ends of a communication link. The scatterer of the device is configured to receive an analog control input from an operator and then converting the control input into a first digital control signal representing the control input and comprised of at least two or more packets. The scatterer clones and addresses each packet representing the control signal and transmits over a WEB based network (or multi-node network or the like). These steps are then repeated as each analog control movement is made. At the apparatus end of the communication network a gatherer is utilized in accordance with the one embodiment of the method of the invention.

The gatherer of the device is configured to produce a control movement corresponding to the analog control input from an operator timely reassembled from the scatterer addressed packet clones. As each addressed packet is received from the scatterer's broadcast over a WEB based network (or multi-node network or the like) the device reorders (reassembles) the signal to represent and correspond to the analog control movement on, for example, a first to arrive basis. In operation, one of each of the clones representing a control packet will arrive before its brethren. These first to arrive members are cached as an assembled unit representing and corresponding to the original operator's analog control input. When no clone of an intermediate or initial packet arrives within a set time (set time or time threshold), the device interpolates according to an embodiment of the invention. In this manner the apparatus provides a substantially improved average latency.

An additional embodiment of the present invention teaches a method of controlling a mission critical aircraft from a remote location over a partially public multi-node network, comprising: receiving at least one of an analog control input and a digital representation of an analog control input; packetizing said at least one of an analog control input and a digital representation of an analog control input into a sequence of addressed packets representing said at least one of an analog control input and a digital representation of an analog control input; cloning and addressing each of said packets such that each packet has at least three identical clones, each of said clones having an address including at least a packet identifier and a clone identifier; and sending said cloned and addressed packets as a group over a multi-node network for control of a remotely controlled mission critical aircraft. The method of controlling a mission critical aircraft from a remote location over a partially public multi-node network, wherein said address further includes a send time. The method of controlling a mission critical aircraft from a remote location over a partially public multi-node network, further comprising: receiving at least some of said group of cloned and addressed packets; assembling and ordering said cloned and addressed packets by address to substantially correspond to at least one of the analog control input and the digital representation of the analog control input into a control output for controlling a mission critical remotely controlled aircraft. The method of controlling a mission critical aircraft from a remote location over a partially public multi-node network, further comprising: determining whether an initial or intermediate packet has not been received; ascertaining a flight condition of said remotely controlled aircraft and at least the elapsed time since each of said received packets was sent or the average time elapsed since substantially all of said packets were received; and sending a control output to said remotely controlled mission critical aircraft, said control output comprising digital values determined from at least one of: (1) received packets, (2) received and interpolated packets, (3) received and missing packets, 4) predetermined safety values, said determining based on at least one of said ascertained flight condition of said remotely controlled aircraft and said at least one of said elapsed time or average elapsed time.

It is to be understood that both the foregoing general description and the following detailed description are exemplary and explanatory only and are not necessarily restrictive of the present disclosure. The accompanying drawings, which are incorporated in and constitute a part of the specification, illustrate an embodiment of the invention and, together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

According to a preferred embodiment of the present disclosure, a scatterer gatherer method and device configured for remote operation of an apparatus is disclosed. The scatterer method and device on the operator side of the network may receive an analog input from a user, convert the analog input to a digital value, and configure the digital value for transmission through a network. The scatterer further configured to send a plurality of identical packets of data through the network, the plurality of packets comprised of the original digital value and at least one clone of the digital value. The route each packet takes through the network may be determined by the elements of the network. Thus, the time taken for a first packet of a group to travel from transmission to reception is unequal from the time taken by a second identical packet of the group. A gatherer method and device at the receiving end of the network is configured to receive each packet, determine which is the first of the group of identical packets to arrive, store the first to arrive from each group and discard the later arriving of the group. The gatherer method and device may be further configured to interpolate to determine a value for a missing group of packets should none of the group of packet clones arrive within a predetermined time threshold. The gatherer further capable of remote manipulation of an apparatus using the stored data. The method further may provide feedback to the user via a return path through the network.

Referring generally to FIGS. 1 through 8, embodiments of a method and Apparatus for transmission and reception of multiple identical signals through a network to remotely operate an apparatus are described in accordance with the present disclosure.

Figure 1:
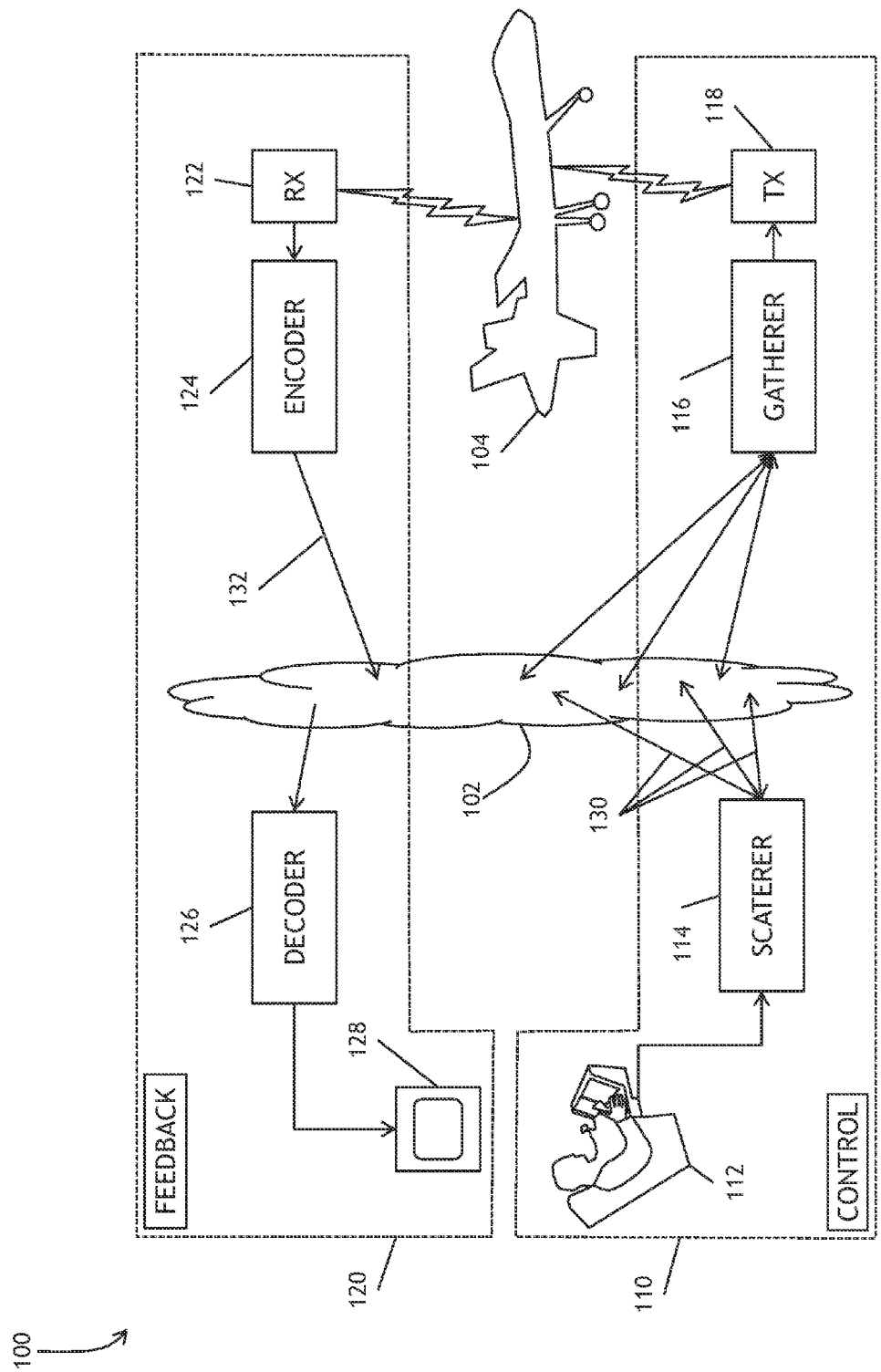
FIG. 1 is an overview of a preferred embodiment of the present invention.

Referring to FIG. 1, a general overview 100 of a preferred embodiment of the present invention is disclosed. A control path 110 may be used to send signals from an operator at a workstation 112 to a remote vehicle 104. A feedback loop may be incorporated to send a feedback signal 132 from the remote vehicle 104 to monitor 128 included as part of the operator workstation 112. Inside the Control Loop 110, an operator at a workstation 112 sends a sequence of analog signals to a scatterer device 114. The scatterer device 114 does a minimum of three basic steps: 1) the scatterer device 114 translates the analog signal to digital, 2) it makes a plurality of copies (clones) of the original digital signal, and 3) it sends the plurality of identical signals 130 as a group to a destination in the network 102, each group sent in order as a sequence. A gatherer device 116 is the destination for the signals 130. The gatherer device 116 is configured to receive the control signals 130 and analyze which of the received signals is the first to arrive from the group of identical signals. The gatherer device further configured to store the first of the signals to arrive, discard the later arriving of the identical signals from the group, interpolate to determine a missing signal in the sequence if required, and send the reconstructed sequence to a remote apparatus 104 manipulating said apparatus as desired by the operator.

Continuing with reference to FIG. 1, a feedback path 120 in a preferred embodiment of the present invention is shown. Remote apparatus 104 may send a feedback signal 132 along a path from apparatus 104 through receiver 122 and encoder 124 to the network 102. The feedback signal 132 may contain a plurality of data necessary for operator at workstation 112 to safely and effectively operate the apparatus 104. Decoder 126 may receive and decode the signal 132 for efficient transmission and display for operator on a monitor 128.

General references in this disclosure to the term "signal" are directed to electronic waveforms containing data as transmitted through a medium. References herein to the term "packet" are directed to bits of data combined into a group of data, said packets configured for efficient transmission through a network. The packet further may comprise a header (packet destination address), a payload (data), and a footer (indicators of packet finish).

Figure 2:
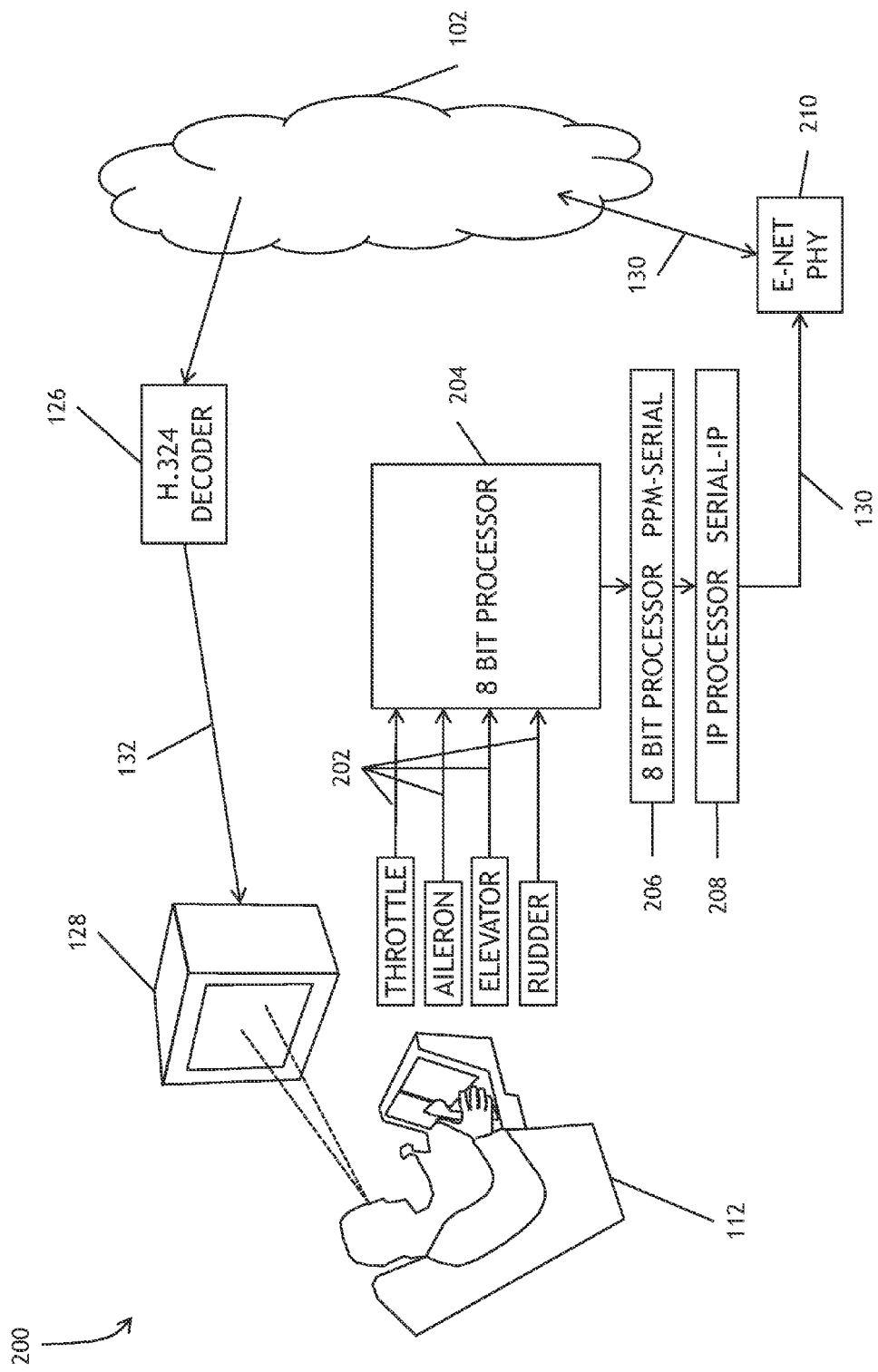
FIG. 2 is a view of a preferred embodiment of the scatterer portion of the present invention.

Referring to FIG. 2, a preferred embodiment of an operator side 200 of a network of the present invention is shown. Operator working at a workstation 112 may make a command signal analog input 202. Processor 204 may be configured to receive inputs 202, convert the inputs 202 from analog to digital Pulse Position Modulation (PPM), and further transmit the PPM digital command signal to processor 206. Processor 204 receives said signal and may transmit the command signals to processor 206 in order as a sequence. A sequence as used herein may be defined as inputs an operator may enter into workstation 112 and transmit in a logical order to accomplish the desired remote task. For example, to roll a remotely operated aircraft from wings level to a thirty degree angle of bank, the sequence would include digital data points sampled from the workstation 112 at regular intervals. The data points are then transmitted through the network and received by the remote operated aircraft to enable the aircraft servos to execute aileron and rudder deflection to accomplish the task of executing the roll. The sampled digital data points may indicate increasing aileron and rudder deflection to execute the roll, then decreasing or likely opposite deflection to stop the roll. The sequence may further include, as a portion or header in a first signal sent, a timeline of anticipated transmission frequency of signals in the sequence used as anticipated packet arrival frequency. Such timeline may be used by the gatherer device on the remote side described herein below as a time threshold to take or delay in taking certain actions. For example, in a header, footer or body of the first packet sent by processor 204 may include a timeline for anticipated delivery of the remaining packets in the sequence. Such timeline may, for example, anticipate an interval of 30 milliseconds (ms) between packet transmission and the same 30 ms for packet delivery frequency. Actual transmission and reception frequency may be greater or less depending on the specific requirements of the remotely operated apparatus. The gatherer device on the remote side may use the exemplary 30 ms reception frequency as the time threshold input described below.

Processor 206 may be configured to receive the command signal, convert the signal from PPM to serial, and retransmit the command signal in serial form. Internet Protocol (IP) processor 208 may be configured to receive the serial command signal, convert serial to IP, and retransmit the IP command signal 130 to the network 102. IP Processor 208 may further address the command signal 130 to a destination within the network 102. During the signal conversion from analog, as the command signal is transmitted from workstation 112, to IP as the command signal leaves IP processor 208, the command signal is cloned a plurality of times. Method 200 may make such clones that the original digital command signal as well as at least one copy or clone of the original command signal are transmitted as a group addressed to the same destination in the network 102. The plurality of command signals are transmitted via Internet Physical Layer (PHY) 210 through the network 102. Each of the group of command signals travels to its destination via a distinct route through the network 102. Various nodes and switches (not pictured) in the network 102 may determine a unique path for a specific command signal from origin to destination and therefore a unique time required for the command signal to travel from origin to destination. Thus, at least two identical packets are travelling through the network, each packet on a unique route through the network, each route taking a unique amount of time.

Continuing with reference to FIG. 2, an operator at a workstation 112 will likely require a level of feedback to ensure apparatus function in accordance with operator input. Feedback signal 132 (further described herein below) is transmitted from remote apparatus (not pictured) to network 102. Feedback signal 132 may be compressed using well known compression techniques. Feedback signal 132 may contain a plurality of parameters vital to operator awareness and apparatus performance. Such parameters may include but are not limited to: control surface deflection, engine RPM, apparatus position, altitude, airspeed, apparatus heading, attitude, and video from a plurality of sources and directions. Decoder 126 may operate to convert the signal from IP to component video via well-known decompression standard such as H.324. Parameters included in Feedback Signal 132 may then be displayed on a video device 128 to operator at workstation 112.

Figure 3:
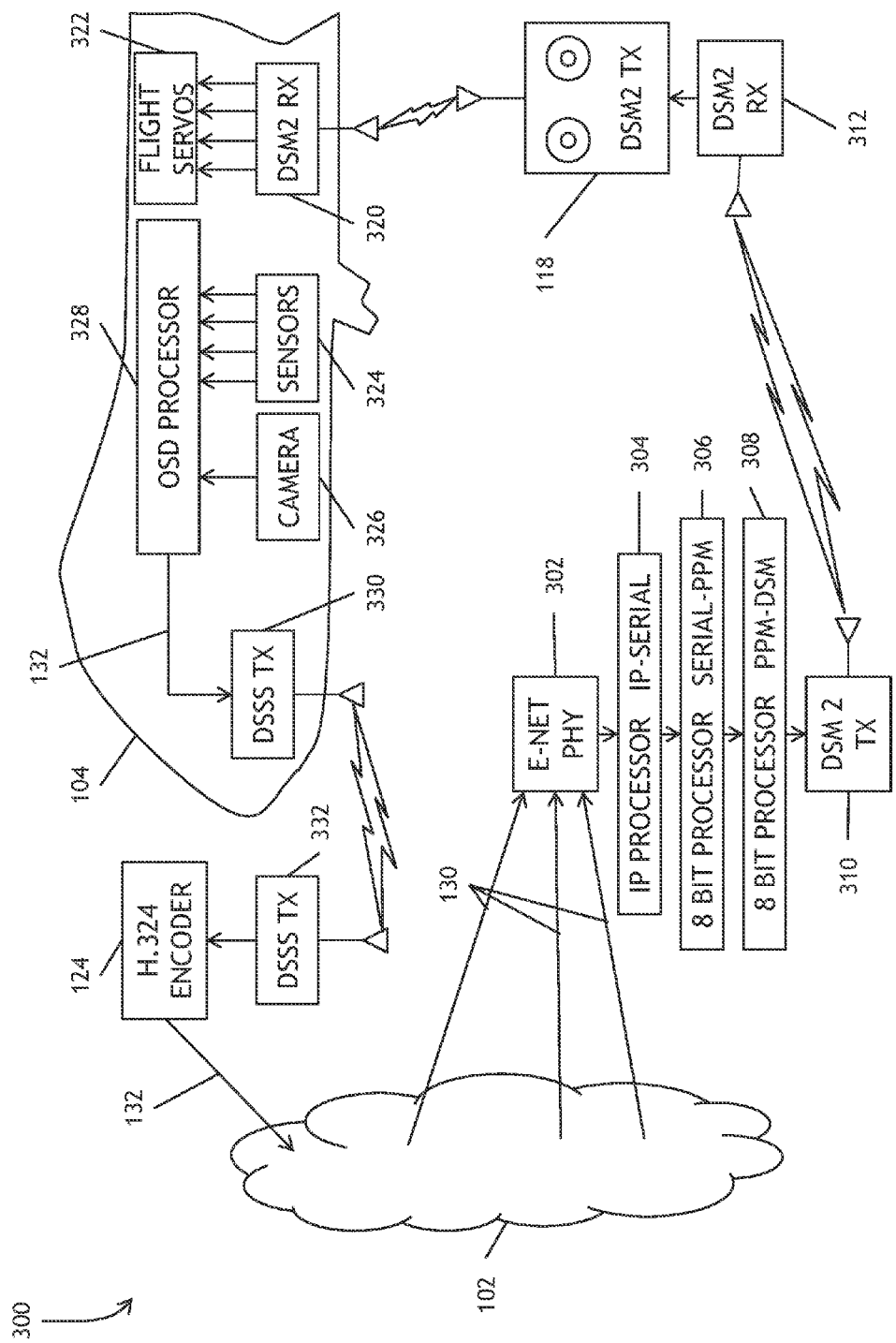
FIG. 3 is a view of a preferred embodiment of the gatherer portion of the present invention.

Referring to FIG. 3, a preferred embodiment of a remote side 300 of the network of the current invention is shown. Receiving PHY 302 on a remote side 300 of the network 102 is configured to receive command signals 130 from Network 102 and route the signals to processor 304. Processor 304 is configured to receive IP signals from PHY 302, convert IP signals to serial, and transmit signals to processor 306. Processor 304 is further configured to accept a time threshold input from a user. The time threshold input may be directly input on the remote side 300 of the network 102, or through other methods such as within a transmission from the scatterer device through the network 102. Such time threshold input may be defined, in one aspect of the current disclosure, as an amount of time processor 304 waits to receive a next command signal in the sequence. If the next command signal in the sequence is received within the time threshold, processor 304 may store a digital value associated with the signal into a memory within processor 304. If the next signal in the sequence is not received within the time threshold, processor 304 may take other action as described herein below. Processor 306 may be configured to receive serial signals from processor 304, convert the signal from serial to PPM, and transmit the PPM signal. Processor 308, may be configured to receive the PPM signal, convert the PPM to (Data Signal Modulator) DSM, and transmit the DSM signal. In a preferred embodiment of the present invention, the DSM signal is received by DSM transmitter 310 for transmission to a receiver 312. For example such transmission may be required in a situation where the remote apparatus 104 is more distant than would be appropriate for an apparatus connected using a wired connection. DSM receiver 312 may be configured to receive the transmission and further transmit to DSM transmitter 118. DSM transmitter 118 may be specifically configured to transmit signals to a specific remote apparatus 104, such signals specifically configured for control of servos 322 found on remote apparatus 104. The signals may be received by DSM receiver 320 located on remote apparatus 104 and further transmitted to individual flight servos 322. Thus, on the remote side of the Network 102, the control signal follows a path from Network 102 to remote apparatus flight servos 322 to remotely manipulate the apparatus 104.

Continuing in reference to FIG. 3, a feedback signal 132 may be generated from sensors 324 on board remote apparatus 104. Camera 326 and sensors 324 may be configured to send specific feedback for the particular remote apparatus 104 as required by the operator at workstation 112 (not pictured). In the preferred example, remote aircraft 104 may transmit a plurality of feedback data 132. Feedback examples may include video from multiple sources, airspeed, altitude, position, heading, and the like. Feedback signal 132 follows a path from camera 326 and sensors 324 to network 102 through On Screen Display (OSD) processor 328, Direct Sequence Spread Spectrum (DSSS) transmitter 330 and receiver 332, and encoder 124. Said encoder 124 may be configured for specific requirements of feedback signal 132 and may encode data to a video compression standard specifically designed for successful travel through the network 102. Typical encoders may be of H.324 video compression standard or other devices recognized by one of ordinary skill.

The gatherer may vary the time threshold based on actual packet delivery rate. As each packet is sent, each packet is addressed to a location in the network. Such address may include additional data including a packet send time. The gatherer may alter the time threshold input based an analysis of actual network transmission and reception speed. As network speeds may change on a day-to-day or minute-to-minute basis, a user-input time threshold may be unrealistic for existing network speed capabilities. The gatherer device may select one of a plurality of speed metrics from which to measure and make the determination to alter the time threshold. One of the metrics may include an analysis of missing packets in the sequence. If, for example, more than two consecutive packets are missing from a sequence, the gatherer device may increase the time threshold to wait a longer period for the next actual packet to arrive. Further, if there have been no missing packets for a period of time, the gatherer device may shorten the time threshold until the gatherer device meets a packet missing tolerance as input by a user. Still further, an analysis may include at least one of the elapsed time since a received packet was sent or an average time elapsed since substantially all packets were received. For example, the gatherer may track the elapsed time between packet send time and packet receive time. If the average elapsed time begins to increase or may exceed a threshold, the method may make a determination to expand the time threshold allowing for lesser interpolation to determine missing or late data. Still further, an analysis may include the average time elapsed since substantially all of the most recent packets were received. Such analysis may track receipt time of each packet and maintain an average amount of time necessary for the next group of packets to arrive. If this average elapsed time increases or may exceed a threshold, the method may make a determination to expand the time threshold allowing for lesser interpolation to determine missing or late data.

The gatherer further may limit the magnitude of the remote apparatus servo displacement value included in the signal to the remote apparatus and limit the use of interpolated data sent to the remote apparatus based on the phase of operation of the apparatus. For example, an aircraft in cruise above 10,000 ft may not require constant input from a remote operator. However, an aircraft in a more critical phase of flight may require immediate and constant input to ensure mission effectiveness or aircraft safety. The gatherer may receive an input from the remote apparatus describing the phase of flight as critical or non-critical, and limit the magnitude of the servo displacement output to the apparatus to specific limiting values. For example, when a remote aircraft is below 100 feet above ground level (AGL) in a critical phase of flight during landing, a specific limitation may include a maximum of 10% aileron servo deflection or 20% elevator servo deflection. Additionally, for example, when an aircraft is in a critical phase of flight during high speed aircraft maneuvers, the gatherer may place a limitation on the rate of servo deflection. Further, the gatherer may place a limitation on frequency of use of interpolated values output to the remote apparatus. For example, if a specific time threshold is being approached or has been exceeded as described above, under a non-critical phase of flight, there may be very little limit on frequency of use of interpolated data (e.g. more interpolated data use at 10,000 AGL feet in cruise). Whereas in a critical phase of flight, there may be a complete limitation (zero use) of the use of interpolated data (e.g. zero interpolated data use at 10 feet AGL during landing).

Figure 4:
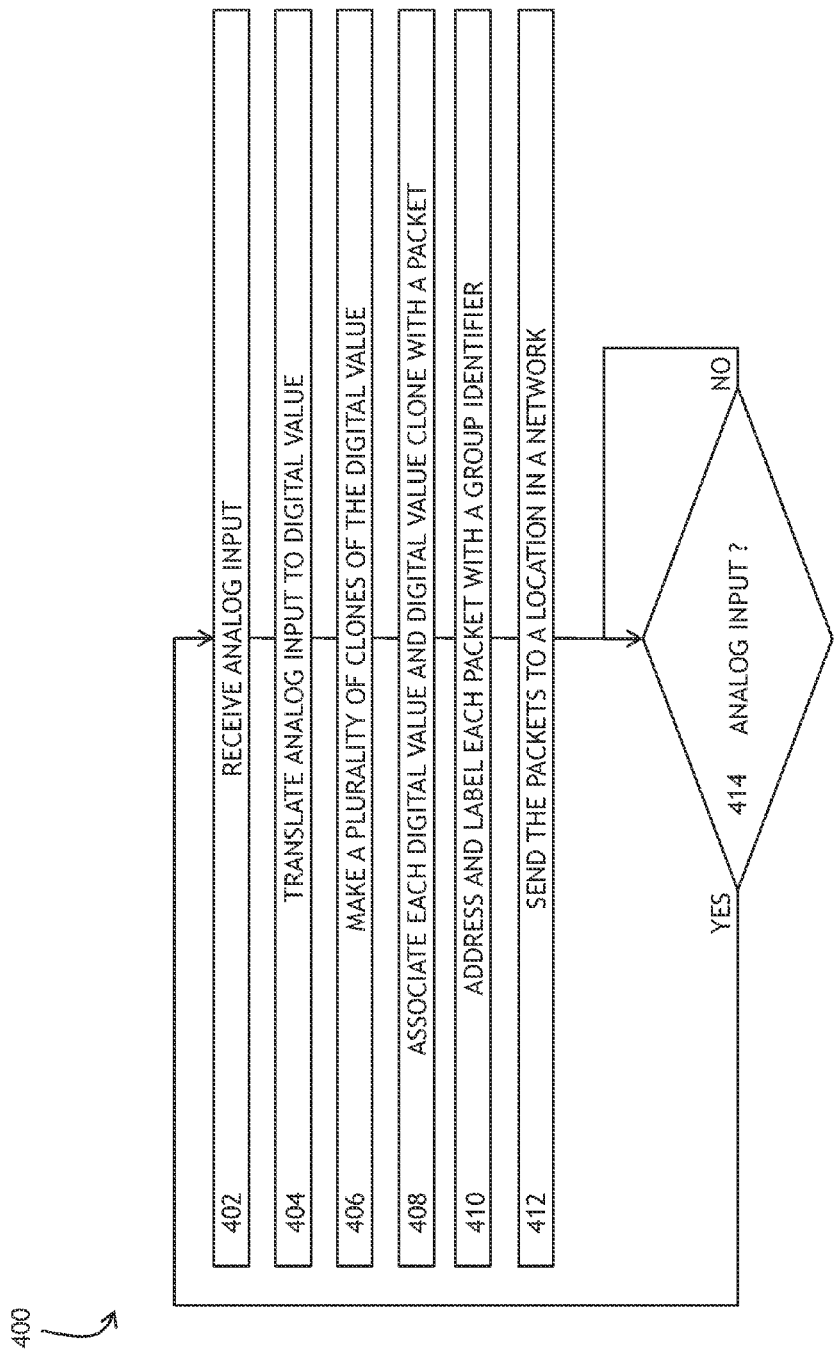
FIG. 4 is a flowchart detailing a preferred embodiment of the scatterer portion of the present invention.

Referring to FIG. 4, a flowchart detailing a preferred embodiment of the scatterer portion of the present invention is shown. Method 400 may receive a first analog input at step 402. The method further converts the analog input to digital value at step 404. Method 400 may then make a plurality of copies (clones) of the digital value at step 406. In a preferred embodiment of the present invention, the method 400 makes at least seven copies of the digital value. The method further associates each digital value, the original and each copy, with an individual packet at step 408, and addresses, timestamps, and labels each packet with a group identifier at step 410. The group identifier label is the same for each of the original and the seven copies and corresponds to the analog input. For example, a group identifier may be 1A through 1H for the packets containing analog input 1, and 2A through 2H for analog input 2 etc. Thus at the end of step 410, ready for transport through the network are eight identical packets, each packet containing the same digital value, and each packet carrying an address and label associating the packet contents with the sequential analog input. Step 412 sends the labeled packets to a location in the network. Step 414 awaits additional analog inputs and begins the process again at step 402.

Figure 5A:
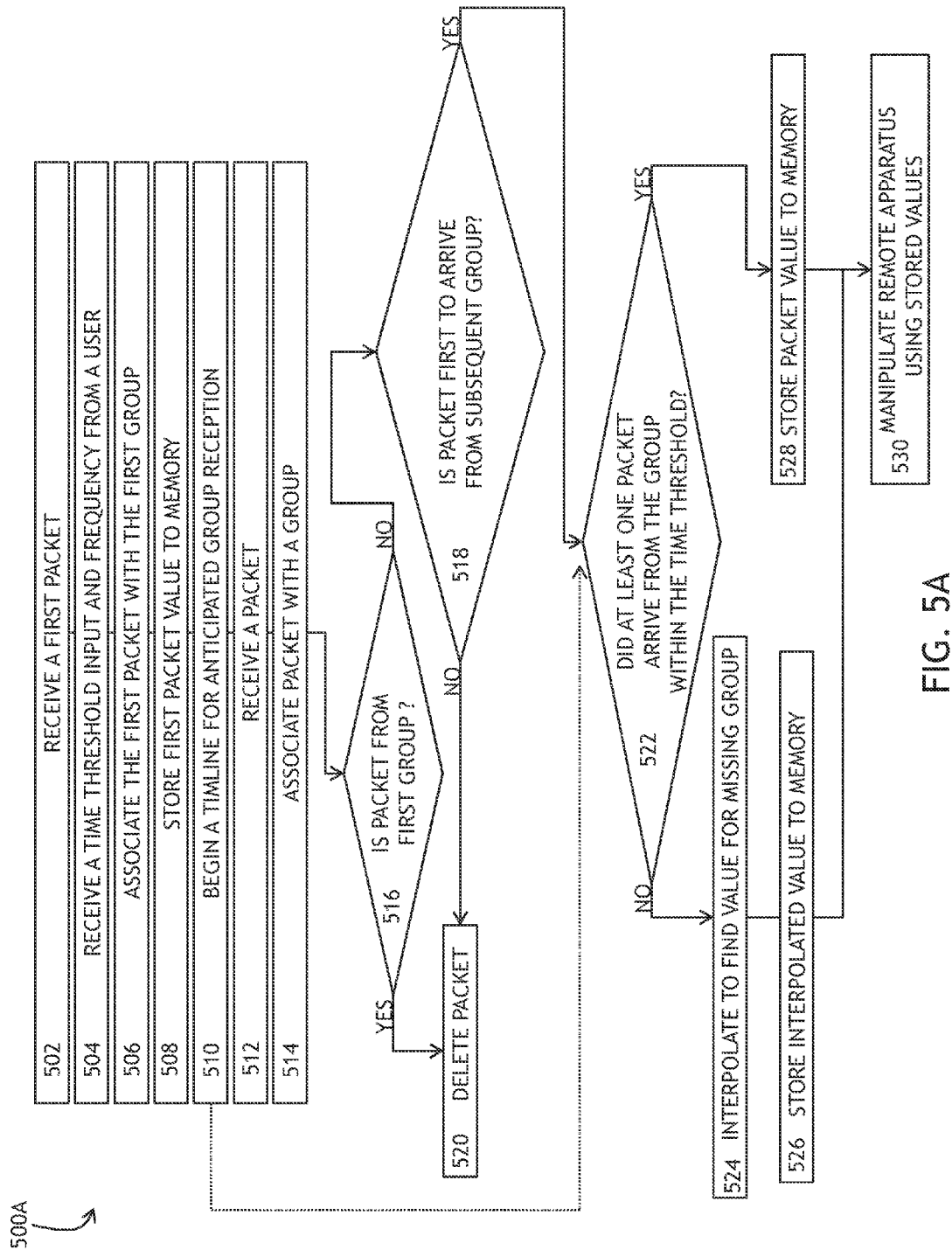
FIG. 5 is a flowchart detailing a preferred embodiment of the gatherer portion of the present invention.

Referring to FIG. 5A, a flowchart detailing a preferred embodiment of the gatherer portion of the present invention is shown. Method 500 may receive a first packet at step 502. The first packet received must be a member of the first group sent by the scatterer portion of the invention as described above. The first packet may further include at step 504 a time threshold input and an expected frequency of arrival for each group of packets in the sequence to arrive. If not accomplished above, method 500 may receive a time threshold input and frequency from a user at step 504. The time threshold may, as described above, enable the gatherer device to wait during the time threshold period for one of the packets from a group of packets to arrive at the gatherer. The frequency input may be described as the anticipated frequency with which groups of packets are expected to arrive at the gatherer. Method 500A may then associate the first packet with a first group in step 506. The first packet received must be a member of the first group sent since packet sequence must begin with group 1 and continue in sequence. The first group also may include actual displacement data for manipulation of the remote apparatus from operator input. However, more likely the first group of packets sent will be administrative in nature and contain little operational data. Gatherer may store the first packet value to a memory in step 508. The memory may be used as a short term storage to store the digital values included in the received packets. Once the method 500A has received the anticipated frequency of packet reception, it may then begin a timeline for anticipated group reception in step 510. For example, a first packet may include a frequency of 30 ms for anticipated packet group reception frequency at the gatherer device. Further, the first signal may include the time threshold of 20 ms for the gatherer device to wait for a packet to arrive from each group in the sequence. To continue with this example, gatherer will open a window beginning 30 ms from time of reception of the first signal for anticipated reception of the second signal. The window will remain open for the 20 ms (the time threshold) for reception of the second signal. If the second signal arrives within the open window, the gatherer may save the digital value included in the received second signal to memory. If no second group packets are received by the expiration of the time threshold (here 20 ms) the window will close. Method 500 may continue to receive a packet in step 512 and associate the received packet with a group in step 514. Method 500A will then begin to analyze the packet to determine to which group the packet belongs.

Continuing with reference to FIG. 5A, method 500A may determine if the received packet is from the first group in step 516. If the answer is yes method will delete the packet since there already is a digital value associated with first group packet stored in memory. This step 516 is required since only the first packet to arrive from the first group will be stored into memory and the scatterer previously sent a plurality of packets of the first group through the network. If the arriving packet is not from the first group control transfers to step 518. Step 518 analyzes if the arriving packet is the first to arrive from a subsequent group in the sequence. If the answer is no the packet and contents are deleted. However, if the answer is yes the analysis continues to step 522 which determines if at least one packet from a subsequent group arrived within the time threshold. If the answer to step 522 is yes, the value associated with the packet is stored to memory. If the answer to step 522 is no then no packets from a group arrived within the time threshold and method 500 may then interpolate to determine a missing value. Method 500A may use well known interpolation techniques including one of Linear or Bilinear Interpolation, Cosine Interpolation, and Cubic interpolation used to determine a missing value. Method 500 may then store the interpolated value to memory in step 526. Method 500 may output the values stored in memory in step 530 to manipulate the remote apparatus.

Figure 5B:
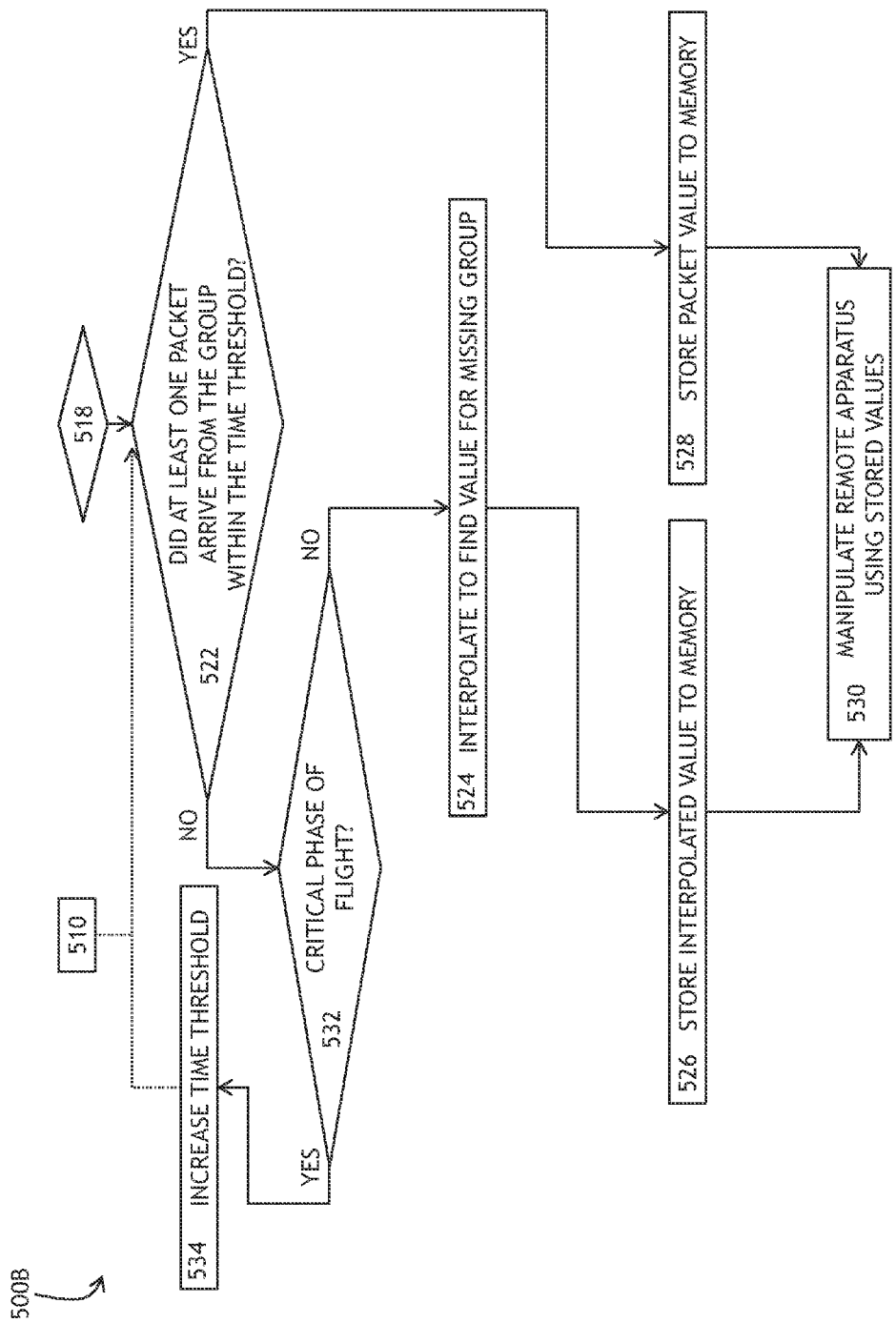

Referring to FIG. 5B, an operator may input a desired time threshold limits or, for example, a short simulation may be provided for demonstrating the characteristics of different threshold settings. The time threshold may be variable allowing the gatherer to increase or decrease the time before an interpolation is required. Continuing the logical progression from FIG. 5A, the gatherer begins a timeline for anticipated group reception 510. Question 518 inquires whether a packet is the first to arrive from a subsequent group. Question 522 inquires whether at least one packet of a group arrives within the set time threshold. If the answer is YES, the received packet is stored to memory at step 528. If the answer to question 522 is NO, logic passes to question 532. Question 532 inquires whether the aircraft is in a critical phase of flight. Critical phases of flight may be defined generally as a phase of apparatus operation where near immediate latency values are required for safe and effective operation of the apparatus. If the apparatus is in a critical phase of flight, it may be more important to receive an actual operator input value versus an interpolated value. If the answer to question is YES, control passed to step 534 to increase the time threshold and wait a longer period for an actual input (at least one member of a group of packets sent) from the operator. If the answer to question 534 is NO, the method may be more tolerant of interpolation and control passes to step 524 to interpolate to generate the late or missing value. Step 526 then stores the interpolated value to memory. Step 530 may then manipulate the remote apparatus according to the stored values.

In an additional aspect of the present invention, the gatherer may resort to output of a predetermined value if a specific time threshold is reached. For example, an operator may input an emergency time threshold. Such emergency time threshold may be defined an elapsed time between reception of the most recent actual operator input and the current time. For example, a mechanical failure in transmission, reception, or network equipment delays or ceases reception of actual operator signals. If the gatherer determines the emergency time threshold has been exceeded, the gatherer may send an emergency signal to the remote apparatus to ensure safety of the apparatus and safety of apparatus surroundings. For example, an emergency signal may include a signal to command a remote aircraft to zero degrees of bank and zero degrees of pitch (straight and level flight), or a climb to a predetermined altitude and hold.

Figure 6:
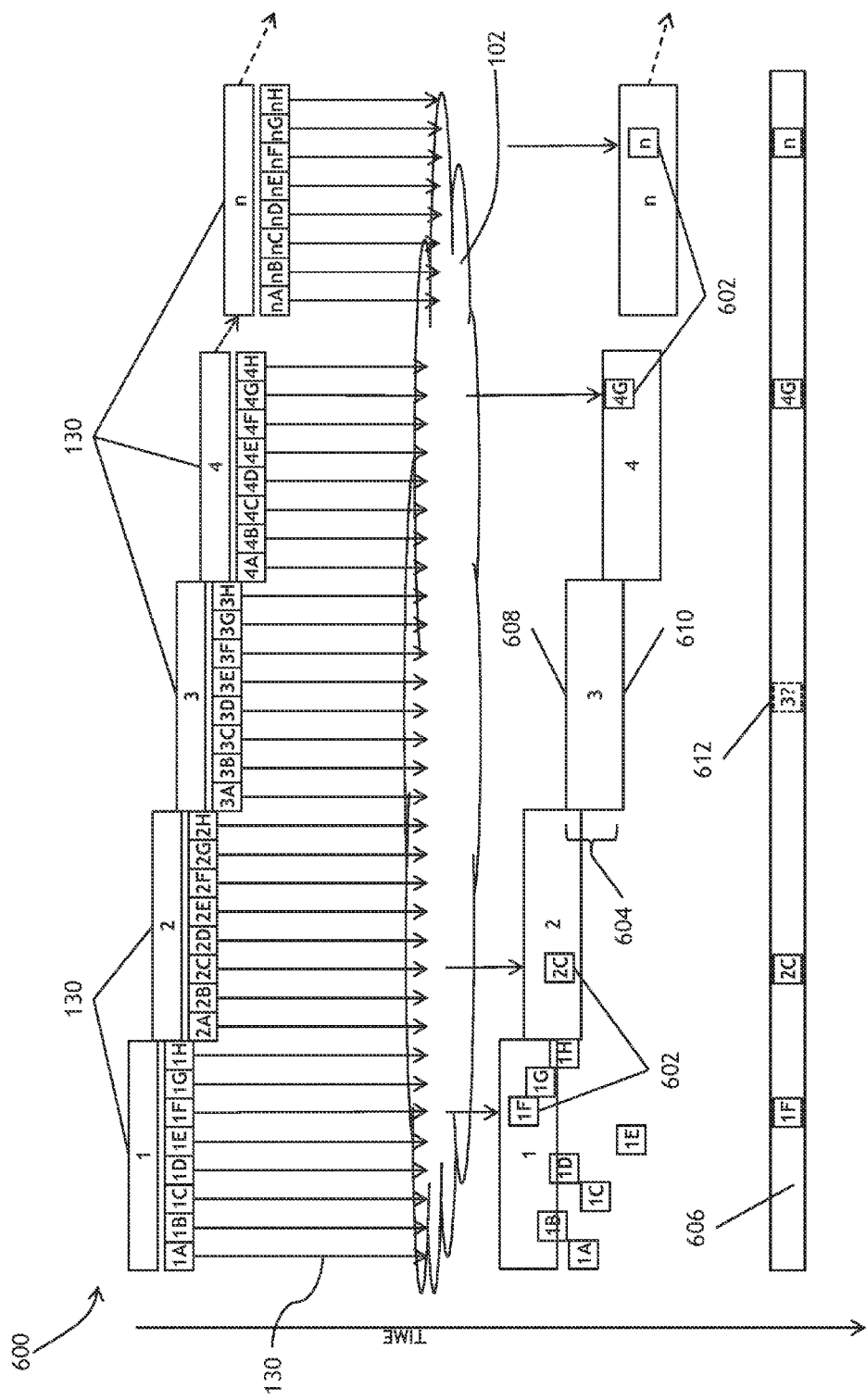
FIG. 6 is a time based logical diagram detailing a preferred embodiment of the present invention.

Referring to FIG. 6, a time based logical diagram detailing a preferred embodiment of the present invention is shown. Method 600 includes signals 130 sent from the scatterer located on the operator side of the network 102. Groups of multiple identical clone packets represented as 1A-1H, 2A-2H etc. are displayed. Method 600 may send the group of packets containing the cloned data, 1A-1H, to a destination in network 102. The path each packet may take through the network may be unique. Therefore, the time required for each packet to travel from scatterer to gatherer may be unique. Method 600 may accept the first packet 602 from each group to arrive at the destination. Further, method 600 may save to memory 606 a digital value found in the first packet from each group to arrive. For example, as shown represented by packets 1A-1H. Although all eight clone packets (1A-1H) were sent at the same time, packet 1F was the first from group 1 to arrive at the gatherer. Method 600 may then save 1F and delete the later arriving packets 1A-1E, 1G-1H. Packet 2C was the first to arrive from group 2, thus the digital value from 2C may be stored to memory 606. The time threshold 604, represented by 608 as the beginning of the window, and 610 as the end of the window is displayed in reference to group 3. Time threshold 604 indicates the time period method 600 will wait for the packets from that group to arrive. For example, if no packets from group 3 had arrived at the expiration of the time threshold 610, method 600 may interpolate to determine a value for group 3. Packet 4G was the first to arrive 602 from group 4, and packet n is displayed as the first to arrive 602 continuing the sequence for n groups. Method 606 may use memory 606 to store values then output the values to manipulate a remote apparatus.

Figure 7:
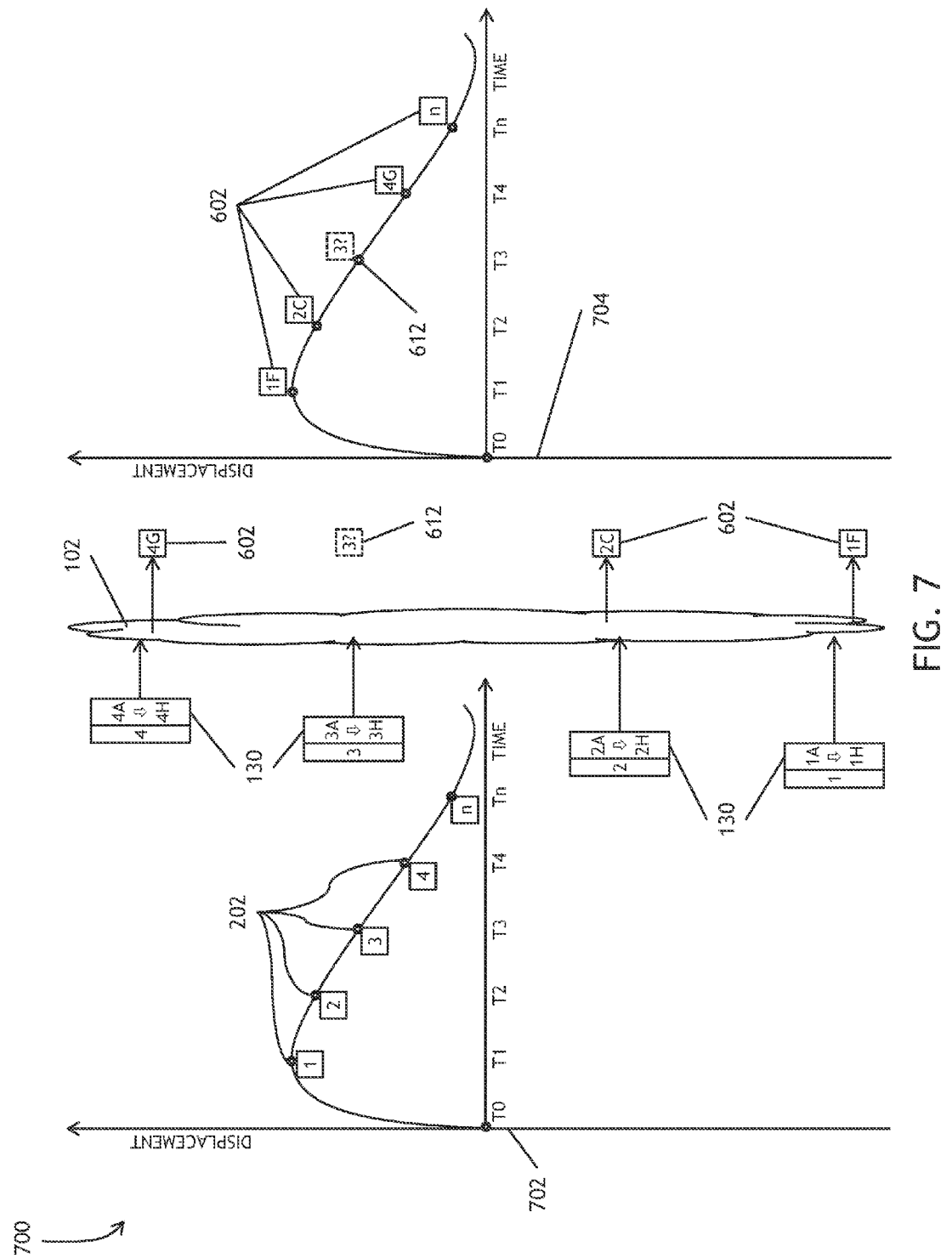
FIG. 7 is a diagram of operator signal versus recreated signal detailing a preferred embodiment of the present invention.

Referring to FIG. 7, a preferred embodiment of a diagram of operator command signal 702 versus recreated signal 704 is shown. Method 700 may receive operator inputs 202 indicating data points (1-$n$) representative of control surface displacement over time ($T_0$ through $T_n$). Analog inputs 202 are converted to digital values and sent included in identical packets 130 through the network 102. The first packets to arrive 602 are stored to memory while if no packets from a group arrive within the time threshold method 700 may interpolate to determine the missing values 612. As above, the example of packets 1F, 2C, 4G as first packets to arrive 602 while time threshold for group 3 expired with no packets from group 3 arriving. Method 700 may then interpolate to determine the missing value 612. Displacement over time is recreated 704 on the remote side of the network 102 and used to manipulate a remote apparatus.

Figure 8:
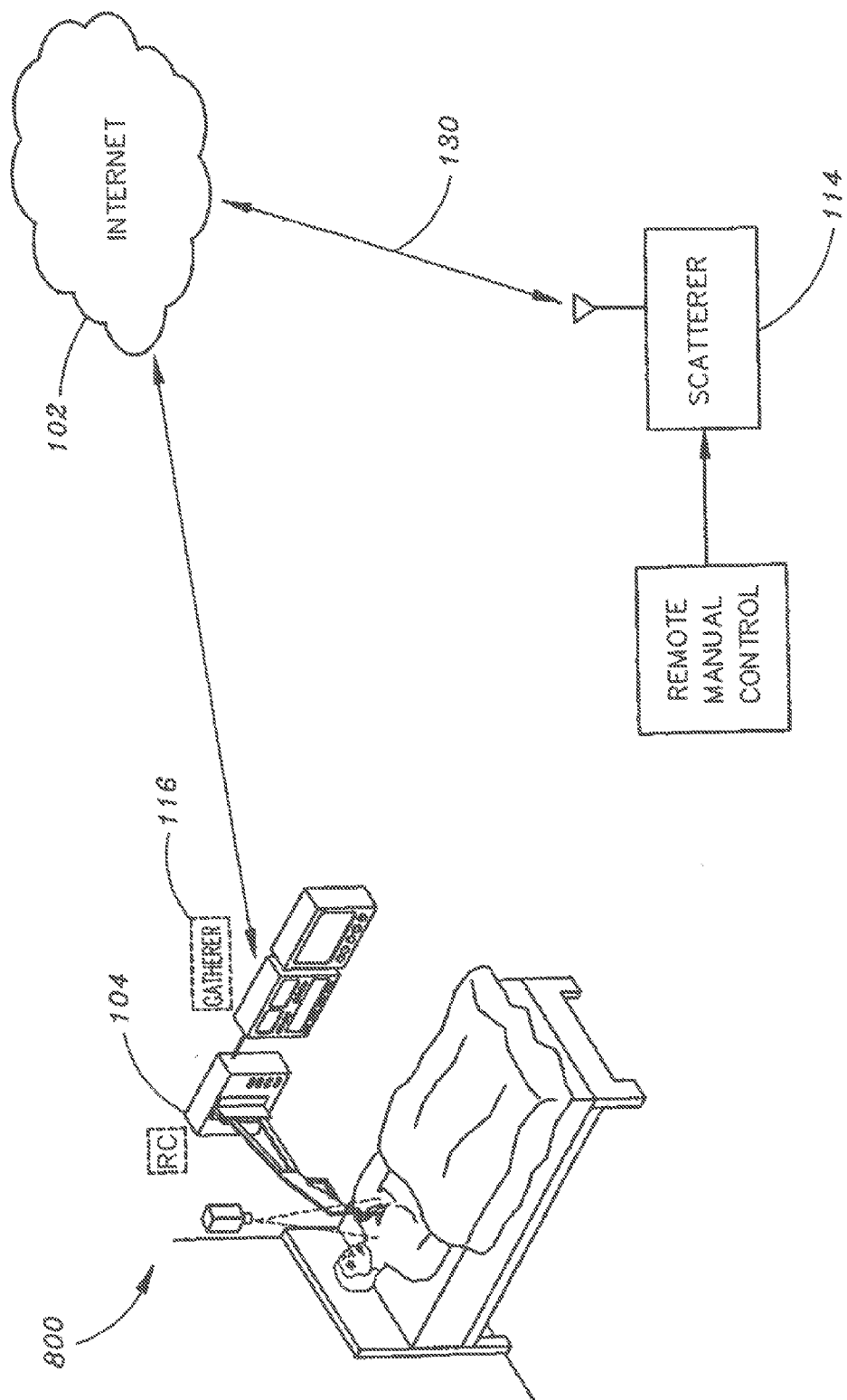
FIG. 8 is a view of an alternate embodiment of the present invention.

Referring to FIG. 8, an alternate embodiment of the present invention is shown. An operator side of network 102 may include a scatterer device 114 receiving control input from a user at workstation 112. The scatterer device 114 receives the control signal from the user, clones the control signal a plurality of times, and sends the original and each clone control signal to a destination in network 102. A remote side of network 102 is the destination for said control signals. The remote side of network 102 may include a gatherer device 116 and a remote apparatus 104. The gatherer device receives the original and each clone, configures the signal for use by the remote apparatus 104, and sends the configured control signal to the remote apparatus to control said apparatus.

It is believed that the present disclosure and many of its attendant advantages will be understood by the foregoing description, and it will be apparent that various changes may be made in the form, construction and arrangement of the components thereof without departing from the scope and spirit of the disclosure or without sacrificing all of its material advantages. The form herein before described being merely an explanatory embodiment thereof, it is the intention of the following claims to encompass and include such changes.

The invention claimed is:

1. A method for reducing control communication delay through a network to remotely operate an apparatus, the method comprising:
  (a) connecting a scatterer device to the network, the scatterer configured for:
    (1) receiving a first analog input from a user;
    (2) converting the first analog input to a first digital value;
    (3) making at least one clone of said first digital value;
    (4) packetizing said first digital value and said at least one clone;
    (5) sending a first group of identical packets through the network, the packets representative of the first digital value and said clone;
    (6) receiving a second analog input from the user;
    (7) converting the second analog input to a second digital value;
    (8) making at least one clone of said second digital value;
    (9) packetizing said second digital value and said at least one clone;

(10) sending a second group of identical packets through the network, the packets representative of the second digital value and said clone;

(11) receiving subsequent analog inputs from the user, translate said inputs to subsequent digital values, clone and send a sequence of subsequent groups of identical packets through the network, the packets representative of the subsequent digital values and said clone;

(b) connecting a gatherer device to the network, the gatherer configured for:

(1) receiving a first packet of data;

(2) associating the first packet with the first group;

(3) storing the digital value of the first packet into a memory;

(4) receiving a second packet;

(5) associating the second packet with a group;

(6) storing the digital value of the second packet into the memory if the second packet is a first packet to arrive from the second group or if the second packet is a first packet to arrive from a subsequent group;

(7) deleting the second packet if the second packet is a member of the first group or if the second packet is not the first packet to arrive from the second group or if the second packet is not the first packet to arrive from a subsequent group;

(8) receiving a time threshold input from a user;

(9) interpolating to determine a value for a group in the sequence if none of the packets of the group are received by the expiration of the time threshold;

(10) converting the digital value to a signal configured for the apparatus; and (c) manipulating the apparatus according to the sequence of digital values stored in the memory by transmitting the signal to the apparatus.

2. The method of claim 1, wherein the first analog input includes inputs for aileron, elevator, rudder and throttle setting for an aircraft.

3. The method of claim 1, wherein the first analog input includes inputs for an apparatus configured to perform surgery.

4. The method of claim 1, wherein the converting analog inputs to digital values further includes a multi-step process accomplished on a computing device.

5. The method of claim 1, wherein the sending the second group of identical packets is delayed a sufficient amount of time to ensure receipt of at least one packet of the first group.

6. The method of claim 1, wherein the time threshold input may comprise unequal time thresholds for different analog inputs.

7. The method of claim 1, wherein interpolating to determine a value further includes an interpolation between values adjacent and values at least two more distant from adjacent in the sequence to the missing group.

8. A scatterer-gatherer device for remote operation of an aircraft, the scatterer-gatherer device comprising:

(a) a scatterer device connected to the network, the scatterer device configured to:

(1) receive a first analog input from a user;

(2) convert the first analog input to a first digital value;

(3) send a first group of at least eight identical packets through a network, the packets representative of the digital value;

(4) receive a second analog input from the user;

(5) convert the second analog input to a second digital value;

(6) send a second group of at least eight identical packets through the network, the packets representative of the second digital value;

(7) receive subsequent analog inputs, translate said inputs to subsequent digital values, and send a sequence of subsequent groups of at least eight identical packets through the network, the packets representative of the subsequent digital values;

(b) a gatherer device connected to the network, the gatherer device configured to:

(1) receive a first packet of data;

(2) associate the first packet with the first group;

(3) store the digital value of the first packet into a memory;

(4) receive a second packet;

(5) associate the second packet with a group;

(6) store the digital value of the second packet into the memory if the second packet is a first packet to arrive from the second group or if the second packet is a first packet to arrive from a subsequent group;

(7) delete the second packet if the second packet is a member of the first group or if the second packet is not the first packet to arrive from the second group or if the second packet is not the first packet to arrive from a subsequent group;

(8) receive a time threshold input from a user;

(9) interpolate to determine a value for a group in the sequence if none of the packets of the group are received by the expiration of the time threshold;

(10) convert the digital value to a signal configured for the apparatus; and

(11) manipulate the apparatus according to the sequence of digital values stored in the memory by transmitting the signal to the apparatus.

9. The device of claim 8, wherein the first analog input includes inputs for aileron, elevator, rudder and throttle setting for an aircraft.

10. The device of claim 8, wherein the first analog input includes inputs for an apparatus configured to perform surgery.

11. The device of claim 8, wherein the translating analog inputs to digital values further includes a multi-step process accomplished on a computing device.

12. The device of claim 8, wherein the sending the second group of identical packets is delayed a sufficient amount of time to ensure receipt of at least one packet of the first group.

13. The device of claim 8, wherein the time threshold input may comprise unequal time thresholds for different analog inputs.

14. The device of claim 8, wherein interpolating to determine a value further includes an interpolation between values adjacent and values at least two more distant from adjacent in the sequence to the missing group.

* * * * *